United States Patent Office

3,773,798
Patented Nov. 20, 1973

3,773,798
PROCESS FOR PREPARING EPOXIDE COMPOUNDS
Carlo Neri and Emilio Perrotti, San Donato Milanese, Italy, assignors to Snam Progetti S.p.A., San Donato Milanese, Italy
No Drawing. Filed June 17, 1971, Ser. No. 154,220
Claims priority, application Italy, June 17, 1970, 26,110/70
Int. Cl. C07d 1/02
U.S. Cl. 260—348 R    2 Claims

ABSTRACT OF THE DISCLOSURE

A compound represented by the formula:

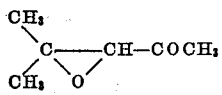

is prepared by reacting acetone in the presence of $(CuOCH_3)Cl$-pyridine.

---

The present invention refers to a process for preparing epoxide compounds and to the products obtained thereby.

It is known that divalent copper compounds are reduced to monovalent copper compounds by means of carbonyl compounds. This reaction is generally carried out on the copper halides, whereas the carbonyl compounds are the organic compounds containing the CO group as aldehydes and ketones. When a compound as aforesaid, selected from the class of the ketones, is reacted with a divalent copper compound, preferably a halide compound, this latter is reduced to monovalent copper compound and the ketone compound is converted into an alpha-halogenketone.

We have now surprisingly found that epoxide compounds may be obtained starting from at least a carbonyl compound having the formula:

wherein R and R' are hydrogen or hydrocarbon radicals having up to 12 carbon atoms, they being equal or different, simple or substituted alkyl, cycloalkyl or aryl radicals or even unsaturated hydrocarbons and selected so that at least one of them is an alkyl or alkylene radical in order to ensure the presence of hydrogen atoms bound to the carbon atom alpha-bound to the carbonyl group; the reaction being carried out between the aforesaid compounds (a) and peculiar divalent copper compounds (b) containing halogen atoms which are reduced to monovalent copper compounds and corersponding to the formula:

$$Cu(OR)X \cdot L_n \quad (b)$$

wherein R is a hydrocarbon radical having up to 20 carbon atoms; X is a halogen as chlorine, bromine, iodine and fluorine, and an anion as $CN^-$, $-OCOCH_3$, enolate, nitrate and the like; L is a substituted or unsubstituted coordinating base selected among phenantroline, dipyridyl, pyridine, dimethylsulphoxide (DMSO), dimethylformamide (DMF), phosphines, arsines, stibines and imidazole; $n$ is a number ranging between 0 and 4. The same behaviour is shown by the analogous compounds of Hg, Al, Co and Tl.

The inventive process is carried out according to the following illustrative scheme:

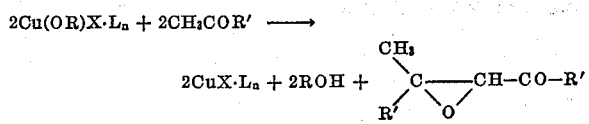

wherein the symbols have the aforesaid meanings. Particularly it is to be noted that the above scheme shows a reaction between two moles of the same carbonyl compound, but it is clear that the reaction may be carried out also between two different carbonyl compounds.

The inventive process is simply carried out; it proceeds with good yields and may be carried out in a large range of pressures and temperatures. The reaction may be realized either with solvents or without any solvent and diluent. According to the latter one the same carbonyl compound is acting as reaction medium. When employing a solvent it may be selected from alcohols, glycols, hydrocarbons, halogenated solvents as carbon tetrachloride, benzene monochloride or dichloride, ethers as dioxane, tetrahydrofurane, glycols ethers, pyridine, picolines, quinolines, dimethylsulphoxide, dimethylformamide, etc.

As to the reaction temperatures, they do not influence the reaction course provided that the liquid phase is maintained as such; the pressure too may be selected in a wide range provided that the liquid phase is always such. Illustrative values of temperatures and pressure preferably selected according to the invention are the ones selected from the range comprised between the room temperature and 180° C. as to the temperatures, and comprised between 1 and 20 atmospheres as to the pressures.

The copper compounds are obtained according to well known methods. For example, the compound

(Py=pyridine) may be obtained by oxidizing CuCl in methyl alcohol containing the pyridine amount necessary to the complex forming. On the contrary, it is possible to obtain the copper compound by means of a change reaction between $CuCl_2 \cdot Py_2$ and methyl alcohol in presence of stoichiometric amounts of alkaline hydroxides as KOH, LiOH and the like.

The copper compound reacting with the carbonyl compound may be preformed and then fed to the reaction vessel, but it may be obtained also during the course of the reduction reaction. In the latter case the carbonyl compound is fed to the reaction vessel, wherein the divalent copper compound is being formed, it being reduced while being formed. A remarkable matter of the inventive process is given by the chance of easily obtaining the divalent copper compound from the reduced copper compound.

As divalent compounds, use is made of the alkoxyhalide metal complexes selected among the alkoxy, arylalkoxy and phenoxy compounds; particularly it may be an unsaturated or substituted one too, obtained from glycols or glycol ethers chloridines, cyano-alcohols, nitroalcohols and oxyesters.

As carbonyl compounds aldehydes, diketones and ketoaldehydes, although a preferable use is made of the ketones selected among the dialkylketones, the substituted or unsubstituted aryl-alkyl-ketones, the acyclic or cyclic ketones in which rings are formed by intramolecular reactions, and generally the compounds in which the two reacting groups belong to the same molecule and may undergo intramolecular reactions bringing to cyclic epoxide compounds through forming new C—C bonds.

The following examples are reported in order to better illustrate the invention without limiting it at all.

EXAMPLES

Various amounts of (CuOCH$_3$)Cl-Py—as a divalent copper compound of a type useful according to the invention—were prepared by means of both the aforesaid methods. 2.5 g. of said compounds were suspended into 15 cc. of the ketone and maintained at 60° C. under nitrogen, for a time varying as regards to the ketone type (½ hour for cyclopentanone and 7 hours for acetone). The reaction end could be visually verified by the formation of a low-yellow precipitate or of a brown-yellow solution. By cooling the highest amount of the complex was recovered as CuClPy. The ketone excess was removed under vacuum and the residue was subjected either to a fractional distillation under vacuum or to a crystallization. The reaction products obtained were:

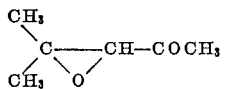

Uncoloured liquid—T$_{eb.}$=59–60° C. at 17 mm. Hg
M.W.=114

It had the same mass spectrum and same NMR of the pure product obtained by synthesis. It was obtained with a yield of 70% with respect to copper.

By working according to the same procedure, it was possible to obtain epoxide starting from acetophenone;

M.W.=238: A 50% mixture of the cis and trans isomers, which were separated as follows:

trans: M.P.=163–164° C. It crystallized from acetone as the first one.

cis: M.P.=89–91° C. It crystallized from ligroin as the first one.

The total yield of the two isomers is 65% with respect to copper.

What we claim is:

1. A process for the formation of the compound:

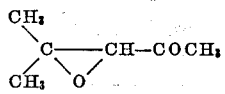

which comprises reacting acetone in the presence of (CuOCH$_3$)Cl-pyridine until said compound is formed, and thereafter, separating and recovering said compound.

2. A process as defined by claim 1 which is carried out under nitrogen.

No references cited.

NORMA S. MILESTONE, Primary Examiner